United States Patent [19]
Ohnuki

[11] Patent Number: 4,592,037
[45] Date of Patent: May 27, 1986

[54] DEVICE FOR DISPLACING A PICKUP HEAD IN MULTI-AXIAL DIRECTIONS

[75] Inventor: Hideo Ohnuki, Yokohama, Japan

[73] Assignee: Hitachi, Ltd., Tokyo, Japan

[21] Appl. No.: 324,442

[22] Filed: Nov. 24, 1981

[30] Foreign Application Priority Data

Nov. 28, 1980 [JP] Japan .................................. 55-168253
Dec. 5, 1980 [JP] Japan .................................. 55-170971

[51] Int. Cl.⁴ .............................................. G11B 7/00
[52] U.S. Cl. ...................................... 369/44; 350/530; 350/255
[58] Field of Search ............... 350/247, 255, 530, 486; 369/44, 45, 46

[56] References Cited

U.S. PATENT DOCUMENTS

| | | | |
|---|---|---|---|
| 3,673,412 | 6/1972 | Olson | 369/45 X |
| 4,011,003 | 3/1977 | Dragt | 350/486 X |
| 4,302,830 | 11/1981 | Hamaoka et al. | 369/45 |
| 4,321,701 | 3/1982 | Arquie et al. | 369/45 |
| 4,437,177 | 3/1984 | Watabe et al. | 369/44 X |

FOREIGN PATENT DOCUMENTS 0119944  9/1981  Japan ...................................... 369/45

*Primary Examiner*—Aristotelis M. Psitos
*Attorney, Agent, or Firm*—Antonelli, Terry & Wands

[57] ABSTRACT

A device for displacing and supporting a driven member pickup head in all the coordinate axis directions of three coordinate axes perpendicular to one another. The device includes at least one support member formed of viscoelastic material for supporting the driven member on a frame. The support member is tensioned and connected between the driven member and the frame and has one end affixed to the driven member disposed in a plane perpendicular to an arbitrarily selected one coordinate axis of the three coordinate axis directions and the other end affixed to the frame disposed in a plane perpendicular to the one coordinate axis. The pickup actuator also includes a device for generating lines of magnetic force in two directions perpendicular to each other, a first coil and a second coil secured to the driven member and having a first path of current and a second path of current respectively disposed in one direction of the magnetic lines of force and perpendicular to each other in a plane perpendicular to the one direction of the magnetic lines of force, a third coil secured to the driven member and having a third path of current disposed in the other direction of the lines of magnetic force and parallel to one of the first path of current and the second path of current in a plane perpendicular to the other direction of the lines of magnetic force, whereby the pickup holder can be independently driven for movement in three axis directions perpendicular to one another.

12 Claims, 14 Drawing Figures

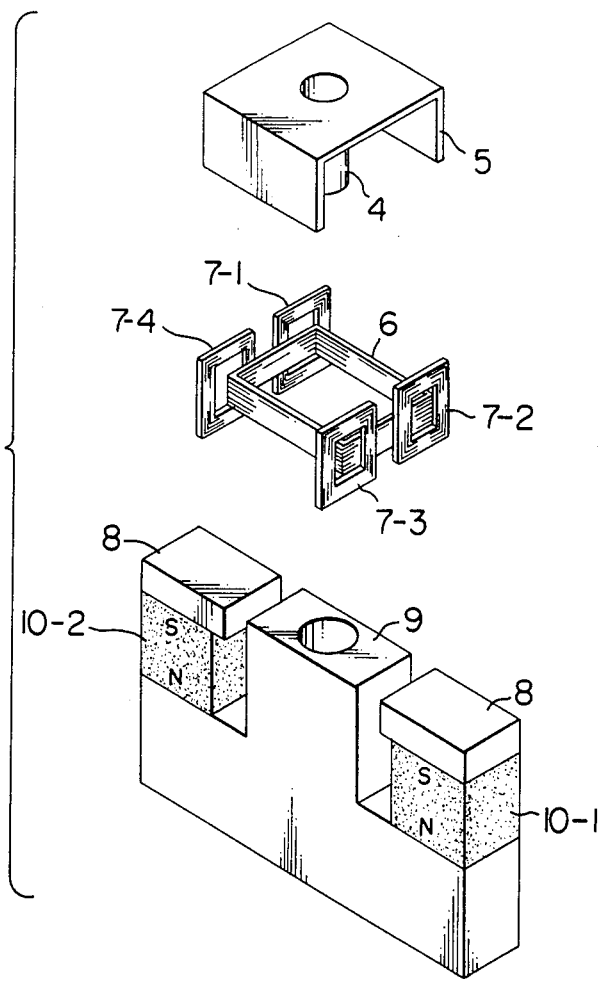
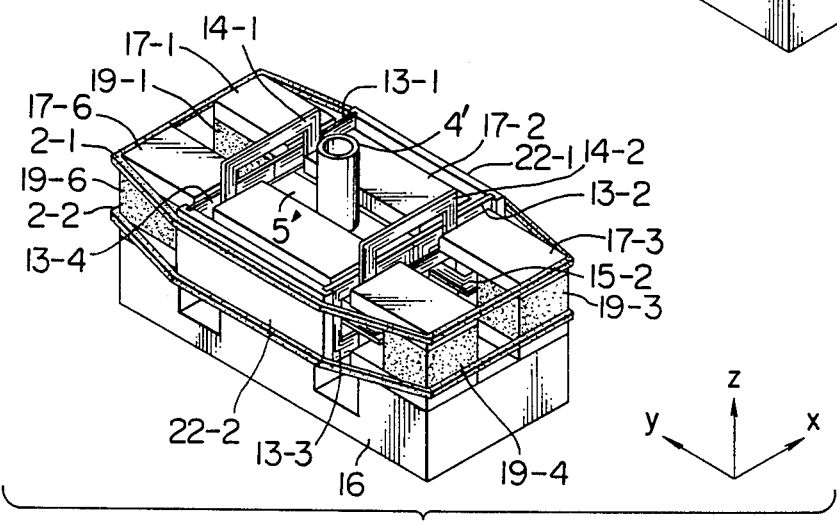
FIG. 9
FIG. 10

DEVICE FOR DISPLACING A PICKUP HEAD IN MULTI-AXIAL DIRECTIONS

BACKGROUND OF THE INVENTION

This invention relates to a device in the form of a pickup actuator for driving a pickup head movable in the direction of any one of three coordinate axes disposed perpendicular to one another in three-dimensional space.

In an optical video disc player and other optical reproducing apparatus using a beam of a laser, the beam of the laser is collected in a minuscule spot to detect a signal recorded on an information recording member. To read out a signal correctly requires effecting of focusing control for focusing the spot of light beam on the information recording member by accommodating the irregularities on the surface of the information recording member or vibration thereof and tracking control for causing the spot of light beam to follow up the correct signal track at all times. Also when there is the risk of a time base error being made due to variations in the rotation of the information recording member or eccentricity thereof, it is necessary to effect time base control to correct such error. To effect control as referred to hereinabove, it is essential that an actuator be provided which supports error sensing means for sensing errors and an optical system and operates such that it actuates the optical system on the basis of an output signal produced by the error sensing means so as to cancel out the error.

One type of actuator of the prior art is disclosed in Japanese Patent Application Laid-Open No. 146611/79, for example, in which a magnetic gap of annular shape and a magnetic gap perpendicular thereto are arranged in superposed relation and a drive coil is mounted in each of the magnetic gaps. This construction suffers the disadvantage that difficulties would be encountered in assembling the parts because it would be impossible to assemble a driven member after all the magnetic circuits have been assembled. Particularly, difficulties would be faced with in correctly positioning each drive coil in the associated magnetic gap. Also, since the magnetic gap of the annular shape is closed at one side, air currents would have difficultly in flowing into and out of the gap, thereby rendering it difficult to dissipate heat generated in the drive coil. The air trapped in the magnetic gap would tend to develop cavity resonance and the phase would change at resonance frequency, so that control would be effected with difficultly.

In the actuator of the prior art shown in Japanese Patent Application Laid-Open No. 146611/79 and other actuators known in the art, the support device used includes plate springs arranged in two stages which can be bent in one direction only. This construction has one disadvantage. Since a drive force oriented in the focusing direction is transmitted to the objective lens via the plate spring for effecting tracking, unnecessary resonance phenomenon would tend to develop. Also, when the driven member is driven in a tracking direction, the reaction occurring in the pivot of the tracking plate spring would be transmitted to the fixed portion through the focusing plate spring, thereby giving rise to resonance. Thus difficulties would be faced in effecting control.

Japanese Patent Application Laid-Open No. 109801/79 discloses another type of actuator in which the actuator is supported by a support device including eight L-shaped springs each formed by bending a rod-shaped spring at a right angle. Some disadvantages are associated with this construction. The springs of the L-shape would have one part of the L-shape twisted when the other part thereof is flexed. Because of this phenomenon, flexural vibration would coexist with torsional vibration and give rise to coupled vibration, so that a complex resonance phenomenon would take place. When the L-shaped springs are formed of metal material, the aforesaid resonance phenomenon would be intensified; when soft material is used for forming them, difficulties would be encountered in effecting stationary positioning.

Still another type of actuator including a mirror that can be tilted is commercially available in U.S.A. which is made by MCA company, Pioneer Company, etc., and used with a video disc player of the optical system. This type of actuator has already been exhibited publicly in Japan. In this type of actuator, the light beam of a laser would tend to be deflected due to the tilting of the mirror, thereby making it difficult to bring the light beam into coincidence with the optical axis of the optical system. This would make it necessary to use an objective lens of a large angle of view. This would increase the size and weight of the objective lens and render same more expensive. To drive a lens of a large size would require a drive system of the overall size.

SUMMARY OF THE INVENTION

This invention has been developed for the purpose of obviating all the aforesaid disadvantages of the prior art. Accordingly the invention has as one of its objects the provision of a drive system for an objective movable in three dimensions which enables focusing control, tracking control and time base control to be effected readily by eliminating the risk of developing an unnecessary resonance phenomenon and which can be assembled with ease and permits the heat generated by drive coils to be readily dissipated.

Another object of the invention is to provide a support device for an objective capable of movement in three dimensions in which tilting of the optical axis can be minimized when focusing control and tracking control are effected.

One outstanding characteristic of this invention is that a first coil and a second coil having a first path of current and a second path of current respectively which cross each other at a right angle in a plane perpendicular to one of two lines of magnetic force oriented in two directions crossing each other at a right angle are mounted in the one line of magnetic force, and a third coil having a third path of current parallel to one of the first path of current and the second path of current (the other path of current is parallel to the other line of magnetic force) in a plane perpendicular to the other line of magnetic force is mounted in the other line of magnetic force, so that an objective to be driven can be moved independently in the directions of three axes crossing one another at a right angle by selectively controlling the electric current passed to the first coil, second coil and third coil. That is, the objective can be mutually exclusively driven for displacement in the three axis so that movement in one axis does not influence or affect movement in the other two axes.

Another outstanding characteristic is that a plurality of support members are employed which are in the form of rods, or thread made of rubber or other isotropic viscoelastic material, and each of the support members has one end thereof secured to the objective to be driven in one plane and the other end thereof tensioned and secured to a holder in one plane parallel to the first-mentioned plane, to thereby support the objective to be driven.

BRIEF DESCRIPTION OF THE DRAWINGS

FIG. 9 is an exploded perspective view of the drive means shown in FIG. 8;

FIG. 10 is a perspective view of a first embodiment of the drive means for driving the pickup holder in three-dimensional directions;

DESCRIPTION OF THE PREFERRED EMBODIMENTS

The invention will now be described in some detail by referring to the embodiments shown in the accompanying drawings.

Figure 1:
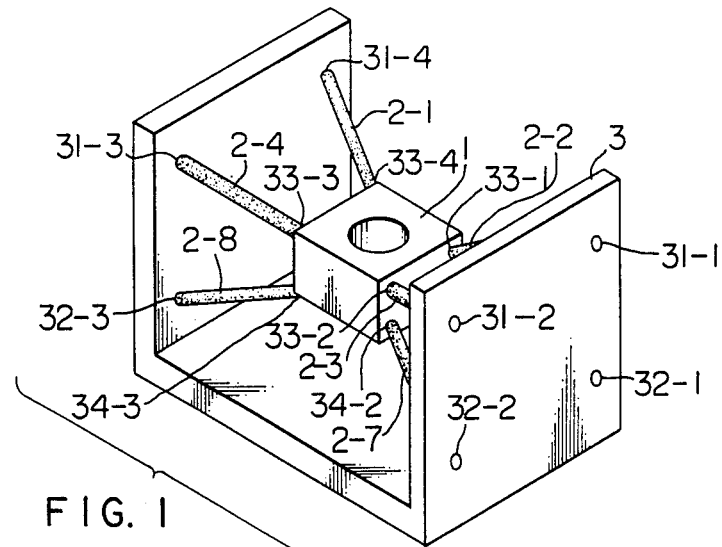
FIGS. 1-7 are perspective views of first to sixth embodiments of the support means for the pickup holder in conformity with the invention suitable for use as an actuator.

FIG. 1 is a perspective view of a first embodiment of the support means for the pickup holder used as an actuator according to the invention. Referring to FIG. 1, a driven member 1, such as a pickup holder having secured thereto pickup means for an optical lens, etc., not shown, so as to provide a pickup head, has one end of each of support members 2-1 to 2-8 (which will be generally designated by the numeral 2 when it is not necessary to designate individual support members) secured thereto, the other end of each of the support members 2-1 to 2-8 being secured to a frame 3. The support members 2 are formed of rubber or other viscoelastic material in the form of thread. In this embodiment, upper fixed ends 31-1 to 31-4 of the support members 2 secured to the frame 3 and lower fixed ends 32-1 to 32-3 thereof secured to the frame 3 (32-4 not being shown) are disposed in first and second planes respectively which are parallel to each other.

Upper fixed ends 33-1 to 33-4 of the support members 2 secured to the driven member 1 and lower fixed ends 34-2 and 34-3 (34-1 and 34-4 not being shown) thereof secured to the driven member 1 are in third and fourth planes which are parallel to each other. The four planes or the first to fourth planes are parallel to each other. Before being assembled, the support members 2 have a length smaller than the distance between the driven member 1 and a fixed portion of the frame 3, and the support members 2 are stretched when assembled by applying uniform tension thereto. In driving the driven member 1, coils secured to the driven member 1 and magnetic poles secured to the frame 3 are used. Details of these parts will be subsequently described.

By using the construction shown in FIG. 1, it is possible to arrange the driven member 1 in a predetermined position in well-balanced manner, and since the support members 2 are formed of viscoelastic material which is soft, the driven member 1 can move smoothly in any direction when a drive force is exerted thereon in the stationary condition. Moreover, the support members 2 are mainly expanded or contracted no matter in what direction the driven member may move, so that no undesirable resonance phenomenon occurs. Since the support members 2 have their fixed ends disposed in planes parallel to each other, the driven member 1 only has three degrees of freedom for actual purposed in the direction of three axes or x-, y- and z-axes which cross one another, because the three degrees of freedom around these axes are inhibited. Thus, if the optical axis of an optical system secured to the driven member 1 coincides with one of the three axes crossing each other, no tilting of the optical axis will occur. This facilitates the design of the optical system included in the driven member 1, so that the driven member of small size and low cost can be used.

Figure 2:
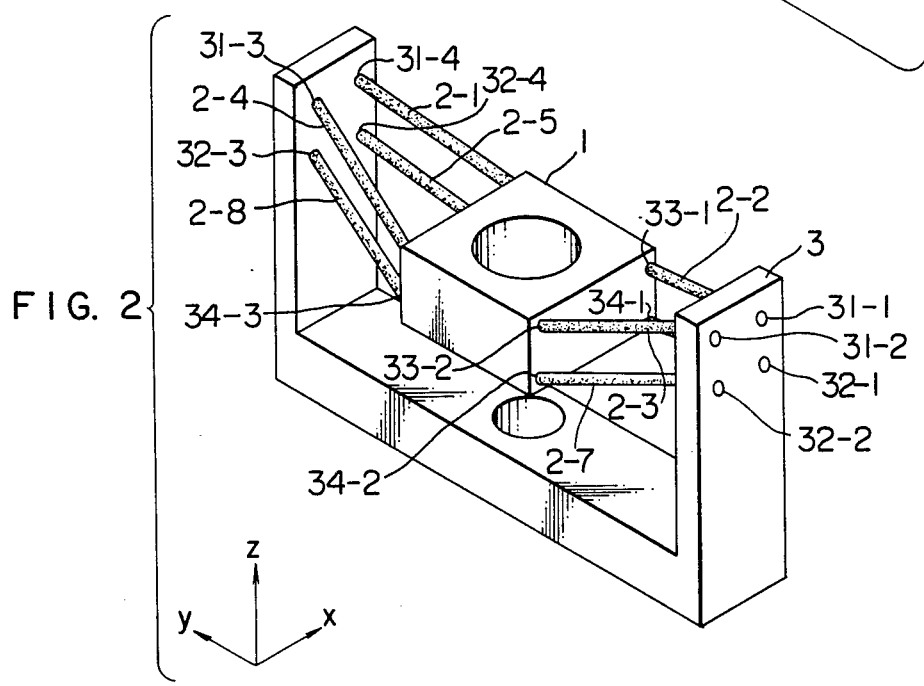
Figure 3:
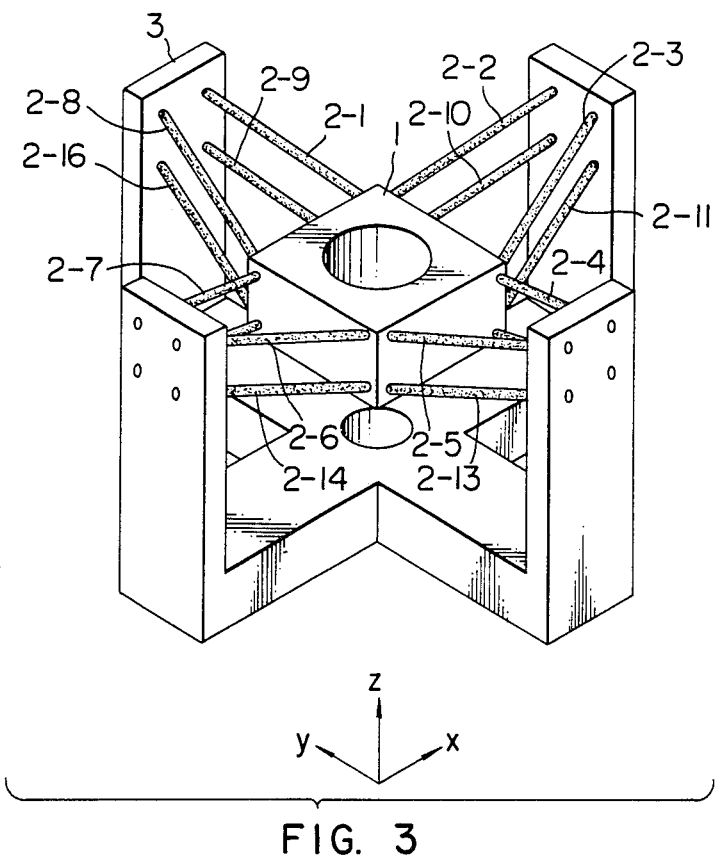

FIG. 2 is a perspective view of a second embodiment of the support means for supporting the driven member used as an actuator according to the invention. In this embodiment, the upper and lower support members 2 are parallel to each other. Like the embodiment shown in FIG. 1, this embodiment is constructed such that the first to fourth planes formed by the ends of the support members 2 are parallel to each other.

By virtue of this arrangement, the displacement of the support members 2 caused by the weight of the driven member 1 would be more uniform than otherwise in the upper and lower layers, so that the effects achieved by the invention as described by referring to FIG. 1 can be increased. In the embodiment shown in FIG. 2, the ranges of displacement of the driven member 1 can be set in such a manner that it can move over a wider range in the direction of a z-axis rather than in the direction of an x-axis and in the direction of a y-axis in the indicated order.

Figure 6:
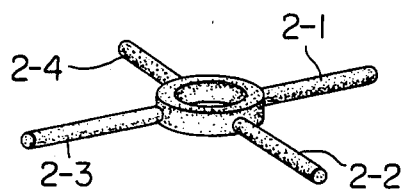
Figure 4:
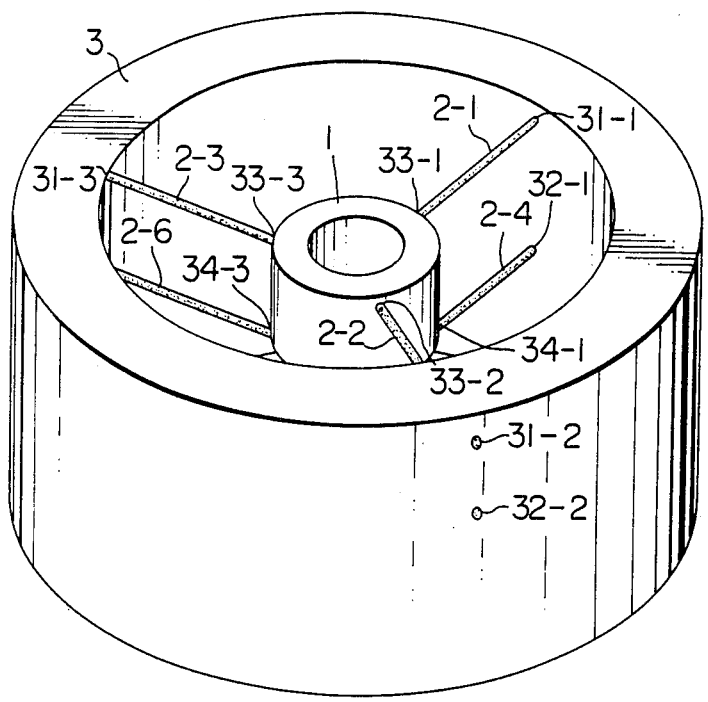
Figure 5:
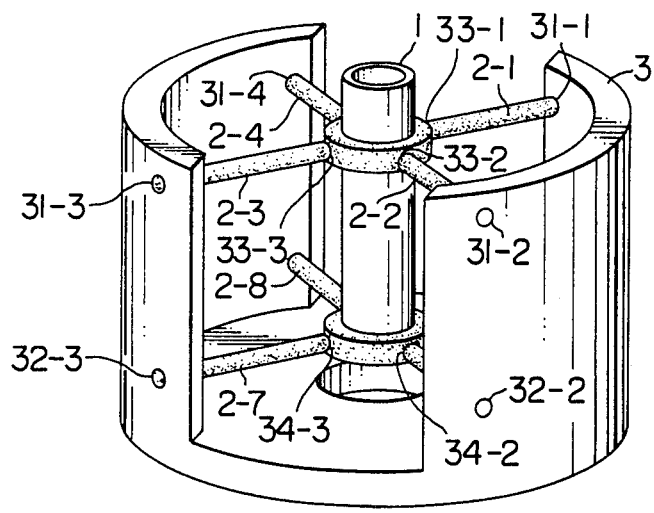

FIGS. 3-7 show in perspective views the constructions of third to sixth embodiments of the invention. The embodiments shown in FIGS. 3-7 are intended to arrange the support members 2 in such a manner that the support members 2 have uniform stiffness in a plane perpendicular to the optical axis (the z-axis in the illustrated embodiments) of an optical system included in the driven member 1. The third embodiment shown in FIG. 3 has the number of the support members increased. The fourth embodiment shown in FIG. 4 has the number of the support members reduced to three (3) both in the upper and lower layers. The fifth embodiment shown in FIG. 5 has a construction enabling some of the support members to be formed integrally, as shown in FIG. 6.

Figure 7:
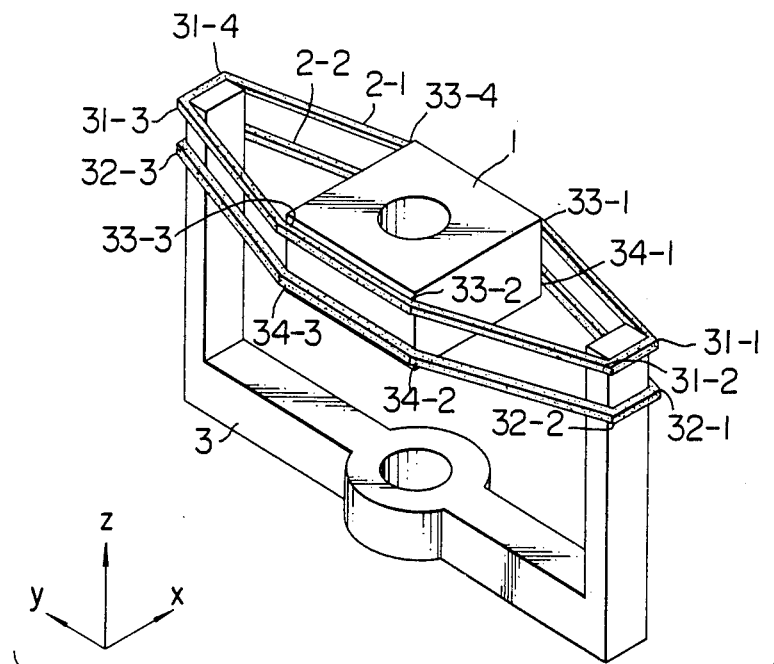

FIG. 7 shows a sixth embodiment using two support members formed of viscoelastic material in the form of a ring. By using the support members 2 in the form of a ring, it is possible to tentatively support the driven member 1 by the tension alone of the support members 2. While the driven member 1 is in this condition, the driven member 1 may be positioned in a predetermined position and then the support members 2 may be fixed to the driven member 1 and the frame 3 at ends thereof as by means of an adhesive agent. By assembling the parts in this way, positioning is facilitated and balance of the tension applied to the support members 2 can be readily adjusted. In this case, the ends of the support members 2 are located such that the first to fourth planes formed by the ends of the support members 2 are parallel to each other, as described by referring to the embodiments shown in FIGS. 1 and 2.

In FIGS. 3-7 showing the third to sixth embodiments, parts similar to those shown in FIGS. 1 and 2 are designated by like reference characters and their description is omitted.

One example of the drive means for driving the driven member supported by the aforesaid support means will now be described.

Figure 8:
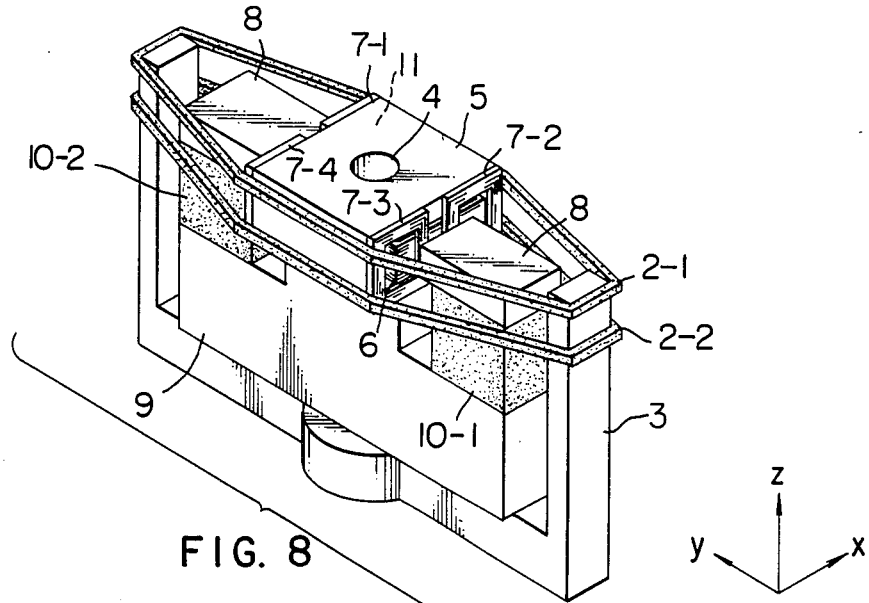
FIG. 8 is a perspective view of an embodiment of the drive means for driving the pickup holder in two-dimensional directions.

FIG. 8 is a perspective view of an embodiment which combines support means with drive means for driving the driven member 1 in two directions perpendicular to each other (or the directions of an x-axis and a z-axis shown). FIG. 9 is an exploded view of the drive means shown in FIG. 8. As shown, the driven member 1 comprises an objective lens 4, a lens holder 5, a drive coil 6 for driving in the z-axis direction, and drive coils 7-1, 7-2, 7-3 and 7-4 (generally designated by the numeral 7 when there is no need to specifically designate each coil) for driving in the x-axis direction. A magnetic circuit including yokes 8 and 9 and magnets 10-1 and 10-2 is secured to the frame 3. The driven member 1 is supported on the frame 3 by the support members 2-1 and 2-2 formed of viscoelastic material in the form of rings in such a manner that the drive coils 6 and 7 are correctly located in a magnetic gap 11. The drive coils 6 and 7 having their windings oriented in directions perpendicular to each other, it is possible to obtain drive forces oriented in two directions (the directions of the x-axis and the z-axis, as shown) exerted on the driven member 1 by applying currents to the drive coils 6 and 7. The drive forces are exerted symmetrically with respect to the center of gravity of the driven member 1 and the support members 2. By virtue of this construction, it is possible to drive the driven member supported by the support means independently in the directions of two axes perpendicular to each other.

Figure 11:
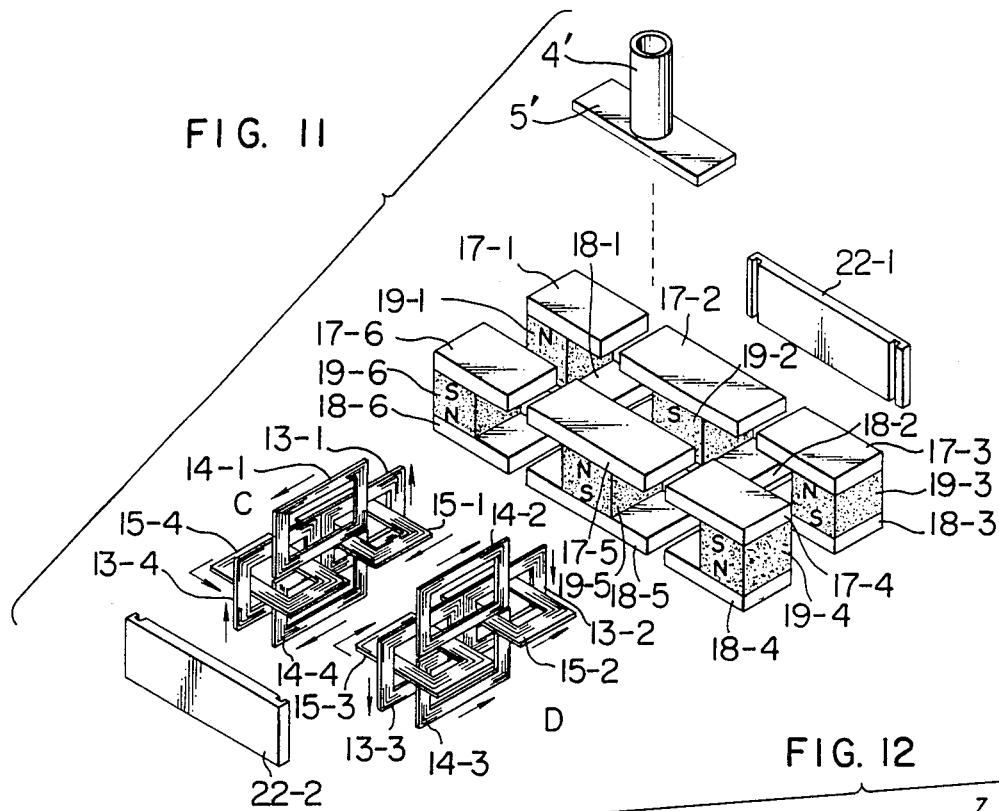
FIG. 11 is an exploded perspective view of the drive means shown in FIG. 10.

FIG. 10 is a perspective view of a first embodiment combining support means with drive means for driving the driven member 1 in three directions (the directions of the x-axis, y-axis and z-axis, as shown). FIG. 11 is an exploded perspective view of the drive means shown in FIG. 10. The driven member 1 comprises an optical system 21, a lens holder 12, drive coils 13-1, 13-2, 13-3 and 13-4 (hereinafter generally designated by 13) for driving in the z-axis, drive coils 14-1, 14-2, 14-3 and 14-4 (hereinafter generally designated by 14) for driving in the x-direction and drive coils 15-1, 15-2, 15-3 and 15-4 (hereinafter generally designated by 15) for driving in the y-axis direction. The coils each have leads for supplying an electric current thereto from outside. The frame 16 has secured thereto a magnetic circuit including yokes 17-1 to 17-6 (hereinafter generally designated by 17) and 18-1 to 18-6 (hereinafter generally designated by 18) and magnets 19-1 to 19-6 (hereinafter generally designated by 19). The driven member 1 is supported on the frame 16 by the support members 2-1 and 2-2 formed by viscoelastic material in the form of rings in such a manner that the drive coils 13, 14 and 15 are correctly located in the magnetic gaps. Coil holders 22-1 and 22-2 hold in place coil groups on both sides of the frame 16. One coil group C is composed of the drive coils of the z-axis direction 13-1 and 13-4, the drive coils of the x-axis direction 14-1 and 14-4 and the drive coils of the y-axis direction 15-1 and 15-4 forming a pair respectively. As shown in FIG. 11, the two coils forming each pair of drive coils of a different direction are arranged such that they have their windings oriented in opposite directions, and the six coils are affixed in a unitary structure. The other coil group D is assembled in the same the coil group C. The coil groups C and D are connected together by an optical system holder 5' having an optical system 4' secured thereto and the coil holders 22-1 and 22-2. The z-axis direction drive coils 13-1 to 13-4 are connected together in such a manner that a current flows in the directions of arrows shown in FIG. 11. The x-axis direction and y-axis direction drive coils are also connected together in like manner. The magnets 6-1 to 6-6 are magnetized in a vertical direction and arranged in such a manner that the adjacent magnets face opposite directions as shown in FIG. 11. By this arrangement, magnetic gaps can be formed between the upper yokes 17-1 and 17-2, 17-5 and 17-4 and 17-3 and 17-2, between the lower yokes 18-6 and 18-5, 18-4 and 18-5, 18-2 and 18-3 and 18-2 and 18-1, and between the upper and lower yokes 17-1 and 18-1, 17-6 and 18-6, 17-5 and 18-5, 17-4 and 18-4, 17-3 and 18-3, and 17-2 and 18-2 respectively.

The support members 21-1 and 21-2 are formed of rubber or other viscoelastic material, and the driven member 1 is capable of freely moving when a drive force produced by each of the drive coils is exerted thereon. When no drive force is exerted, each drive coil is supported in a correct stationary position in the corresponding magnetic gap.

Of the coil groups C and D correctly located between the upper yokes and the lower yokes, the x-axis direction drive coils 14-1 to 14-4 and the z-axis direction drive coils 13-1 to 13-4 have their windings oriented in directions perpendicular to each other in the respective magnetic gaps, so as to enable drive forces to be obtained which extend in two directions perpendicular to each other in one magnetic gap.

The y-axis direction drive coils 15-1 to 15-4 are located in the magnetic gap which is at a right angle to the aforesaid magnetic gaps, to enable a magnetic force to be obtained which is perpendicular to the aforesaid two directions.

By this arrangement, parallel magnetic gaps can be used for driving the driven member 1 in three directions which are perpendicular to one another, and it is also possible to insert the coil groups C and D in a magnetic circuit after it is assembled. Thus the coil groups C and D can be assembled with the driven member 1 in such a manner that the coil groups C and D are correctly located in the magnetic gaps with ease and the actuator can have its performance improved.

Figure 14:
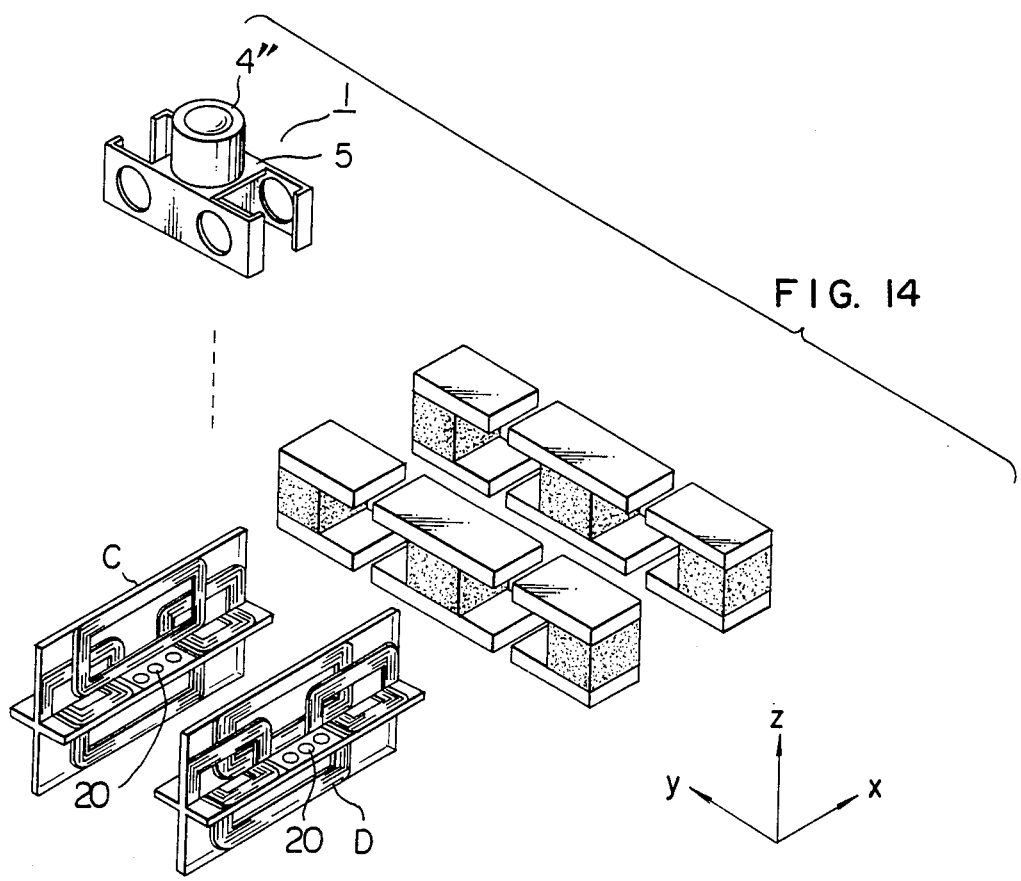
FIG. 14 is a perspective view of a modification of the embodiments shown in FIGS. 10 and 11.

FIG. 14 is an exploded perspective view of an embodiment for securing drive coils for various axis directions. The coil groups C and D are formed into a unitary structure as by an epoxy resin and connected together by an optical system holder 5" having an optical system 4" secured thereto. 20 is a terminal section for connecting leads, not shown, for passing an electric current to the drive coils for various axis directions.

Figure 12:
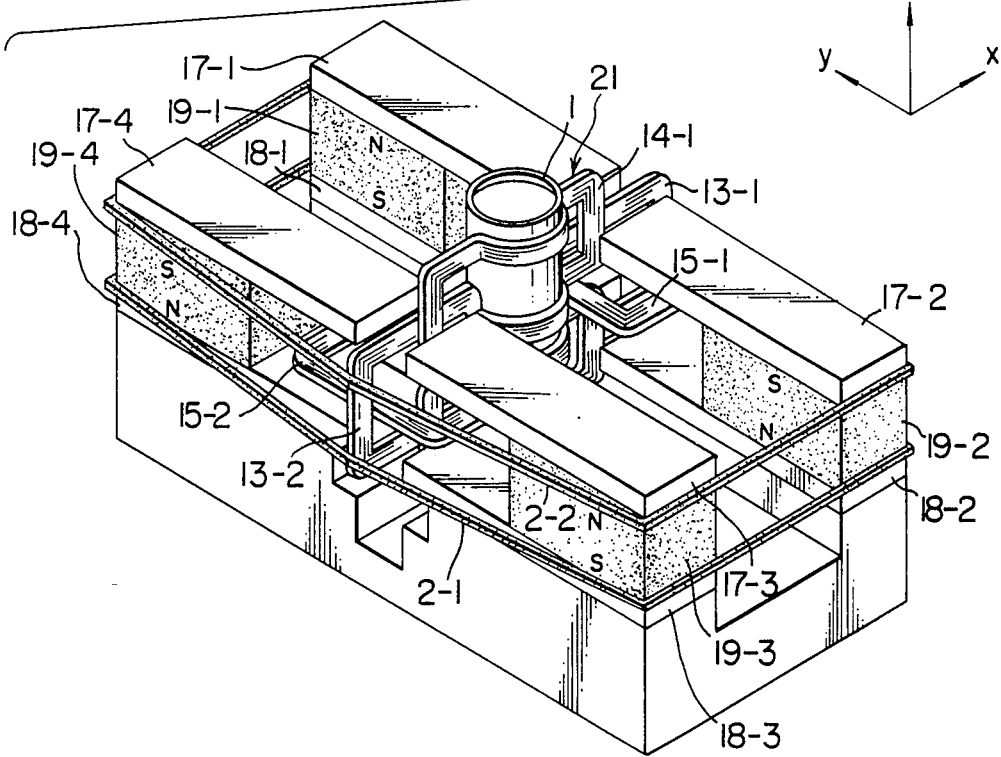
FIG. 12 is a perspective view of a second embodiment of the drive means for driving the pickup holder in three-dimensional directions.
Figure 13:
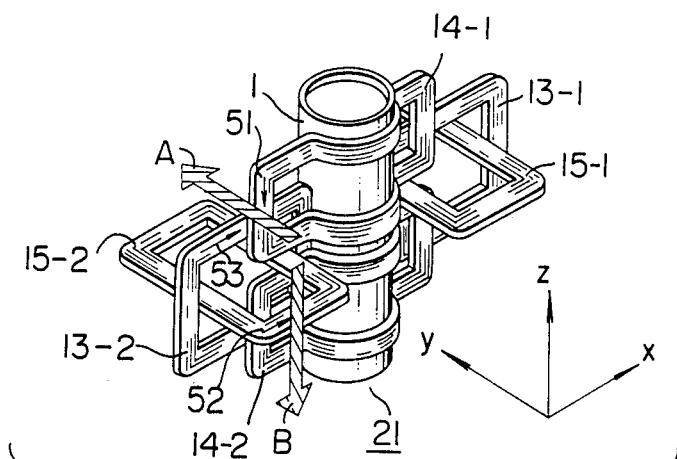
FIG. 13 is a perspective view showing portions of the drive means shown in FIG. 12.

FIG. 12 is a perspective view of the actuator comprising a second embodiment, showing the construction of the drive means, and FIG. 13 is a perspective view of the second embodiment, showing its vibration system. In FIG. 12, two pairs of permanent magnets 19-1 and 19-2 and 19-4 and 19-3 which are vertically magnetized are arranged such that as indicated by the characters N and S in FIG. 12, the adjacent two permanent magnets are magnetized in opposite directions. By the permanent magnets 19-1, 19-2, 19-4 and 19-3 and the yokes 17-1, 18-1, 17-2, 18-2, 17-3, 18-3, 17-4 and 18-4, magnetic gaps are formed between the magnetic poles of unlike signs of the adjacent permanent magnets and between the yokes 17-1 and 17-2, 18-1 and 18-2, 17-3 and 17-4 and 18-3 and 18-4 respectively. Magnetic gaps are also formed between the magnetic poles of the permanent magnets themselves and between the yokes 17-1 and 18-1, 17-2 and 18-2, 17-3 and 18-3 and 17-4 and 18-4 respectively. By setting the coordinate axes as shown in the upper right portion of the figure, the driven member 1 including the parts of the optical system comprising the z-axis drive coils 13-1 and 13-2, x-axis drive coils 14-1 and 14-2, y-axis drive coils 15-1 and 15-2 and the objective lens constitutes a vibration system. As shown in FIG. 13, the z-axis direction drive coils 13 and the x-axis drive coils 14 are superposed over each other in such a manner that the axes of their windings are parallel to each other and the directions of the windings are partially perpendicular to each other. The y-axis drive coils 15 are arranged such that the axes of their windings are perpendicular to the axes of the windings of the z-axis and x-axis drive coils 13 and 14.

The x-axis drive coils 14 which are located straddling the two pairs of permanent magnets 19-1 and 19-2 and 19-4 and 19-3 are used also for fixing in place the z-axis direction drive coils 13-1 and 13-2 and the y-axis direction drive coils 15-1 and 15-2. The x-axis drive coils 14 are also used for supporting the driven member 1. These coils are formed integrally by high molecular material, such as epoxy resin and securedly fixed in place, to provide a vibration system the details of which are subsequently to be described. As shown in FIG. 12, the vibration system 21 is supported by the support members 2-1 and 2-2 in the magnetic gap in such a manner that it is not in contact with the yokes and it has a space for moving in vibration.

In FIG. 13, a line of magnetic force between the yokes 17-3 and 17-4 and a line of magnetic force between the yokes 17-3 and 18-3 are indicated by arrows A and B respectively. The x-axis line magnetic coil 14-1 has exerted thereon a force in accordance with the Fleming's left-hand rule, because a path of current 51 forming a part of the path of movement of the coil is disposed in the magnetic field of the line of magnetic force A. When a current is passed through the path of current 51 in the z-axis negative direction as shown in FIG. 13, the x-axis drive coil 14-1 generates a force oriented in the x-axis positive direction because the magnetic field is in the y-axis positive direction, so that the driven member 1 is displaced in the z-axis positive direction.

Likewise, when a current is passed in the x-axis positive direction as shown in FIG. 12, the y-axis drive coil 16-2 generates a force oriented in the y-axis positive direction and the driven member 1 is displaced in the y-axis positive direction, because a path of current 52 forming a part of the path of current of the coil is disposed in the magnetic field of the line of magnetic force B.

Likewise, when a current is passed in the z-axis positive direction as shown in FIG. 13, the z-axis drive coil 13-2 generates a force oriented in the z-axis positive direction and the driven member 1 is displaced in the z-axis positive direction, because a path of current 53 forming a part of the path of current of the coil is disposed in the magnetic field of the line of magnetic force A.

Besides the lines of magnetic force A and B, lines of magnetic force exist between the yokes 17-4 and 18-4, 18-3 and 18-4, 17-1 and 18-1, 17-1 and 17-2 and 18-1 and 18-2. Operation of these lines of magnetic force is similar to those described hereinabove by referring to the lines of magnetic force A and B.

In FIG. 13, although not shown, leads are connected to the end of each of these coils for supplying a current thereto from outside in the same manner as the embodiment shown in FIG. 14.

The support members 2-1 and 2-2 are formed of viscoelastic material, such as rubber, and the vibration system 21 can move freely by the drive force generated in each coil. Also, in the absence of a drive force, each drive coil is supported in a stationary position in the corresponding magnetic gap.

In the aforesaid construction, by passing a current selectively to each drive coil, the driven member 1 can be driven to move in a corresponding direction.

From the foregoing description, it will be appreciated that according to the present invention, unnecessary resonance difficultly is avoided and the parts can be readily assembled because the support members are formed of rubber or other viscoelastic material. The presence of the fixing portions of the support members in planes parallel to each other inhibits the degrees of freedom of the direction of rotation of the driven member, so that the driven member moves only in three-axis directions perpendicular to one another. This enables designing of an optical system to be facilitated and allows an overall compact size and reduced costs to be obtained in a support device.

According to the invention, a driven member can be freely moved in three axis directions perpendicular to one another, so that an optical reproducing apparatus of compact size and capable of adjusting position readily can be provided. Since no movable mirror is used, it is possible to use an objective lens of small angle of field and low costs, thereby reducing the cost of the optical reproducing apparatus.

According to the invention, parallel magnetic gaps alone are used, so that assembling is facilitated and unnecessary resonance occurs because of the absence of closed chambers. Thus control can be readily effected. Also, by allowing currents of air to flow in the drive coil section, heat in the drive coil section can be well dissipated.

I claim:

1. A device for enabling displacement of an information signal pickup holder in multi-axial directions comprising:

an information signal pickup holder for supporting an information signal pickup means;

means for generating lines of magnetic force in two directions perpendicular to each other;

a first coil and a second coil having a first path of current and a second path of current respectively disposed in one direction of said lines of magnetic force and perpendicular to each other in a plane perpendicular to said one direction of said lines of magnetic forec, said first coil and said second coil being secured to said information signal pickup holder;

a third coil having a third path of current disposed in the other direction of said lines of magnetic force and parallel to one of said first path of current and said second path of current in a plane perpendicular to said other direction of said line of magnetic force, said third coil being secured to said information signal pickup holder; and support means for supporting said information signal pickup holder for enabling displacement in all the coordinate axial directions of three coordinate axes perpendicular to one another;

whereby said information signal pickup holder can be mutually exclusively for displacement in the three axial directions perpendicular to one another by the interaction of said coils upon energization.

2. A device as claimed in claim 1, wherein said support means comprises at least one support member formed of viscoelastic material.

3. A device as claimed in claim 2, wherein a plurality of said support members formed of viscoelastic material are provided.

4. A device for enabling displacement of an information signal pickup holder in multi-axial directions comprising:

an information signal pickup holder for supporting information signal pickup means; and support means for supporting said information signal pickup holder for enabling displacement in all the coordinate axial directions of three coordinate axes perpendicular to one another said support means including at least one support member for supporting said information signal pickup holder on a frame, said support member being formed of viscoelastic material and connected between said information signal pickup holder and said frame while being tensioned, said support member having one end affixed to said information signal pickup holder disposed in a plane perpendicular to an arbitarily selected one coordinate axis and the other end affixed to said frame disposed in a plane perpendicular to said one coordinate axis direction, whereby said information signal pickup holder can be mutually exclusively driven for displacement in the three axial directions perpendicular to one another.

5. A device as claimed in claim 4, wherein said support member is in the form of a ring formed of viscoelastic material.

6. A device as claimed in claim 4, wherein said support member is formed singly in a radial form with viscoelastic material.

7. A device as claimed in claim 4, wherein a plurality of support members formed of viscoelastic material are provided.

8. A device for enabling displacement of an information signal pickup holder in multi-axial directions comprising a frame, an information signal pickup holder for supporting information signal pickup means, and support means coupled to said information signal pickup holder and said frame for supporting said information signal pickup holder for enabling displacement relative to said frame in three axial directions perpendicular to one another, said support means including at least one support member formed of viscoelastic material, whereby said information pickup holder can be mutually exclusively driven for displacement in the three axial directions perpendicular to one other.

9. A device as claimed in claim 8, wherein said at least one support member is connected between said information signal pickup holder and said frame while being tensioned, said at least one support member having one end thereof affixed to said information signal pickup holder and disposed in a plane perpendicular to a selected one of said three axial directions, and the other end affixed to said frame and disposed in a plane perpendicular to said selected one axial direction.

10. A device as claimed in claim 8, wherein said at least one support member is in the form of a ring.

11. A device as claimed in claim 8, wherein said at least one support member is an integral member having radial extensions extending between said pickup holder and said frame.

12. A device as claimed in claim 8, wherein a plurality of said support members are provided.

* * * * *